June 6, 1933.  C. A. CAMPBELL  1,912,567

AIR BRAKE

Filed Aug. 28, 1931

Inventor
Charles A. Campbell

Attorneys

Patented June 6, 1933

1,912,567

UNITED STATES PATENT OFFICE

CHARLES A. CAMPBELL, OF WATERTOWN, NEW YORK, ASSIGNOR TO THE NEW YORK AIR BRAKE COMPANY, A CORPORATION OF NEW JERSEY

AIR BRAKE

Application filed August 28, 1931. Serial No. 559,996.

This invention relates to air brakes and particularly to triple valves.

The principal object of the invention is to improve the construction and operation of "retard stops", such as are used to resist the motion of the triple piston from normal release and recharge position to restricted release and recharge position.

In certain types of triple valve, the retard stop engages not only the piston stem, but also the triple slide valve which customarily has a lost motion connection with the piston stem. As it takes some force to shift the slide valve, and as the thrust is exerted eccentrically on the retard stop, malfunctions have been caused by cocking or tilting of the retard stop. Standardization and close space limits have rendered it difficult to design a satisfactory stop, particularly in cases where heavy retard stop springs must be used. The present invention meets the requirements.

A preferred embodiment of the invention is illustrated in the accompanying drawing, in which,—

Figure 1:
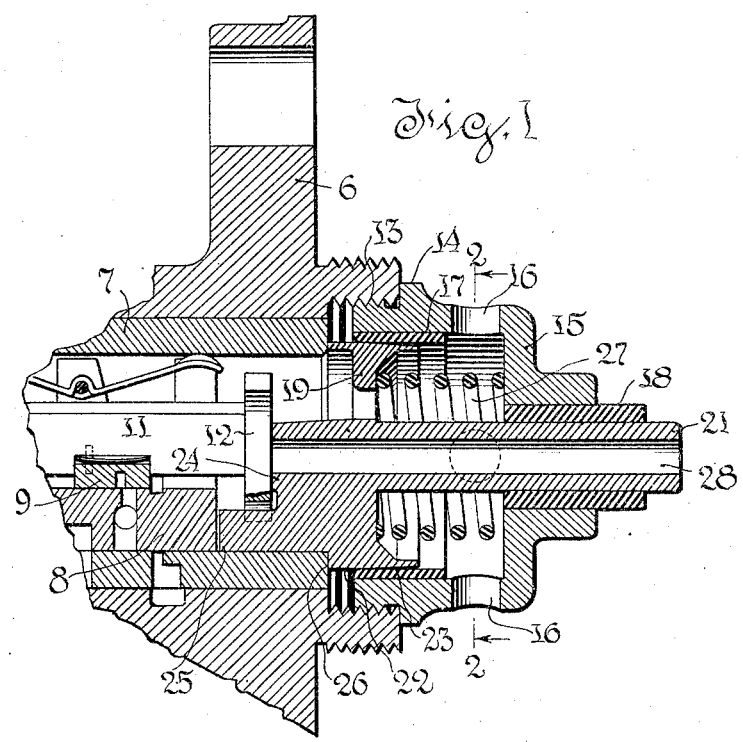
Fig. 1 is an axial section through a portion of a triple valve with the improved retard stop in place.
Figure 3:
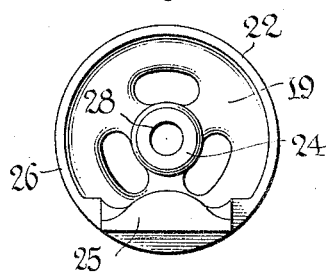
Fig. 3 is an end elevation of the retard stop, looking to the right relatively to Fig. 1.
Figure 4:
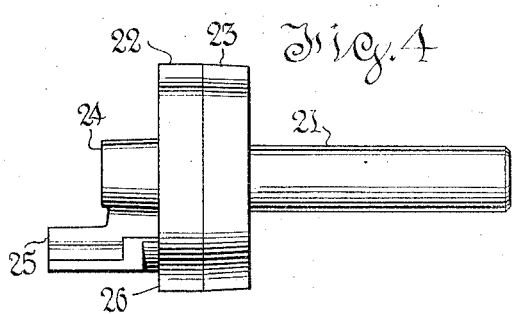
Fig. 4 is a side elevation of the retard stop.
Figure 2:
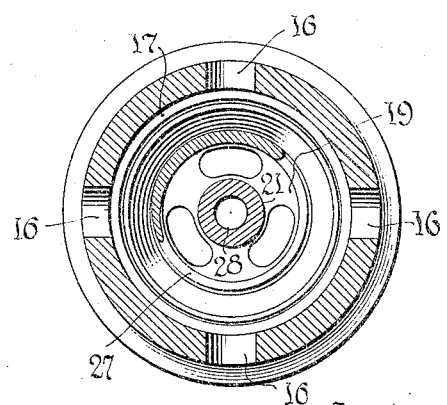
Fig. 2 is a section on the line 2—2 of Fig. 1.

The bolting flange of a triple valve appears at 6 and 7 indicates the slide valve chamber bushing. A portion of the slide valve is indicated at 8 and a portion of the graduating valve at 9. The piston stem 11 has a guiding spider 12 and at its other end is connected to the usual triple piston (not shown).

Threaded into the body of the triple valve at 13 and alined by flange 14 is a cup shaped guide member 15. This is ported at 16 to permit flow of air between the slide valve chamber and auxiliary reservoir. The guide member 15 is provided with two guide bushings, a large one 17 of slightly greater diameter than the chamber in bushing 7, and a concentric smaller one 18.

Slidable in these guide bushings is the retard stop, comprising generally a head 19 and a projecting stem 21. The head has at its outer end (the end toward the slide valve chamber) a cylindrical bearing area 22 which fits the bushing 17, and adjacent this, and toward the stem 21 a slightly tapered area 23, which facilitates assembly without requiring an unduly large bearing contact. The stem 21 fits bushing 18 and is freely slidable therein.

The head is provided at the outer end with a central boss 24 which engages the end of stem 11, and an eccentric boss or lug 25 which engages the slide valve 8. The parts are so formed as to provide engagement of the edge 26 with the end of bushing 7 to limit the motion of the retard stop under the urge of retard stop spring.

The retard stop spring is shown at 27. It encircles stem 21 and is compressed between the end of member 15 and the head 19.

To reduce weight, the head 19 takes the form of a ported web with peripheral flange, as clearly shown in the drawing, the ports also serving to permit the passage of air. There is an axial bore or passage 28 extending through the retard stop from end to end. This not only reduces weight, but also permits the passage of the thrust rod used in certain test racks to hold the triple piston outward while performing certain tests familiar to those skilled in the art.

In the maximum outward position of the retard stop, the major portion of surface 22 projects beyond the guiding surface of bushing 17 (see Fig. 1). This reduces the bearing area to the minimum.

While the form and proportions shown and described are preferred and have demonstrated their value in actual use, modifications are possible and are contemplated.

What is claimed is,—

1. A retard stop for use in triple valves of the type including a slide valve chamber, comprising in combination a guide member adapted to be mounted in a triple valve and having two guiding surfaces, one of a diameter slightly exceeding the diameter of the slide valve chamber of the triple valve, and the other concentric therewith, smaller and more remote from the slide valve chamber; a shiftable stop member having a head portion guided in the first-named guiding surface, and a tubular projecting stem guided in the second-named guiding surface, said head portion serving to limit motion of the stop member toward the slide valve chamber by collision with the end of the slide valve chamber wall; and a coil spring encircling said stem and reacting between said guide member and head.

2. The combination of claim 1 further characterized in that said head has a cylindrical bearing surface and an adjacent slightly tapered surface, the major portion of said cylindrical surface projecting beyond the first-named guiding surface at the limit of the motion imparted by said spring.

In testimony whereof I have signed my name to this specification.

CHARLES A. CAMPBELL.